UNITED STATES PATENT OFFICE.

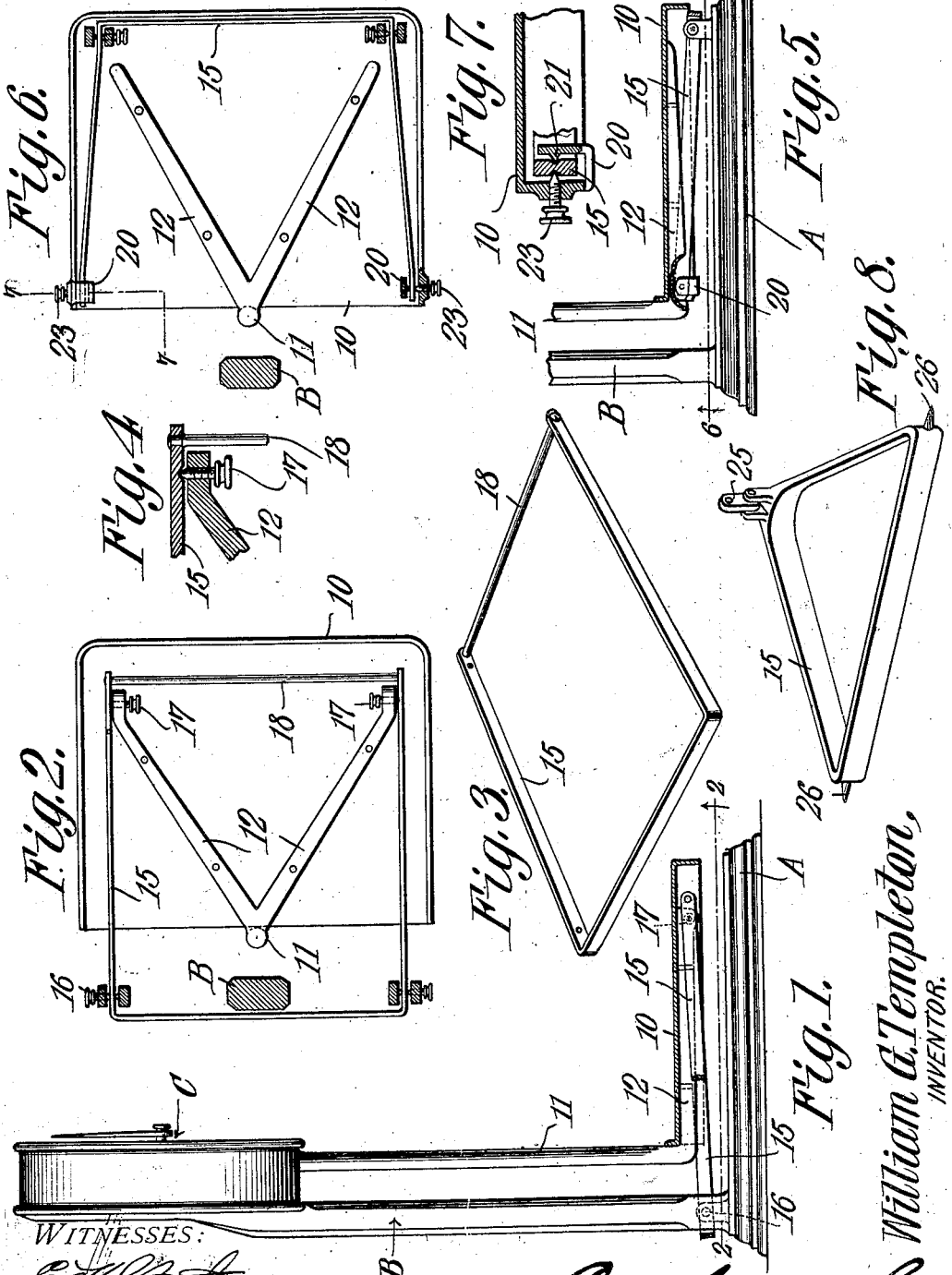

WILLIAM G. TEMPLETON, OF COLORADO SPRINGS, COLORADO.

SCALE.

No. 902,266.   Specification of Letters Patent.   Patented Oct. 27, 1908.

Application filed November 8, 1906, Serial No. 342,536. Renewed September 15, 1908. Serial No. 453,142.

*To all whom it may concern:*

Be it known that I, WILLIAM G. TEMPLETON, a citizen of the United States, residing at Colorado Springs, in the county of El Paso and State of Colorado, have invented a new and useful Scale, of which the following is a specification.

This invention relates to weighing scales, and has for its principal object to provide a novel form of load receiver or weighing platform, connected to any desired form of weight indicating device by a single suspension bar or the like, and which will accurately weigh any article placed in any position thereon.

A further object of the invention is to provide a load receiver or platform with means for preventing any swaying or lateral movement when the load is placed thereon, the receiver being arranged to move only in an approximately vertical path.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a side elevation, partly in section, of a load receiver or platform constructed in accordance with the invention. Fig. 2 is a sectional view of the same on the line 2—2 of Fig. 1, looking upward. Fig. 3 is a detail perspective view of the equalizing or guiding link, detached. Fig. 4 is a detail sectional view, on an enlarged scale, of one of the pivotal connections. Fig. 5 is a view corresponding to the lower portion of Fig. 1, illustrating a modified arrangement of the equalizing and guiding means. Fig. 6 is a sectional view on the line 6—6 of Fig. 5, looking upward. Fig. 7 is a detail sectional view on an enlarged scale on the line 7—7 of Fig. 6. Fig. 8 is a detail perspective view showing a further modification of the link.

Similar numerals of reference are employed to indicate corresponding parts throughout the several figures of the drawings.

The scale shown includes a base A, a standard B, and an indicating means C, the latter in the present instance being merely the pointer of a scale of the spring type.

The load receiver or weighing platform 10 is suspended by a rod 11 which is rigidly attached to the load receiver, and in the present instance the lower end of the suspension rod is provided with a pair of forked arms 12 which extend under and are firmly secured to the load receiver.

Arranged under the load receiver is an equalizing or guiding device which may take the form of a U-shaped link 15, pivoted at one end on a pair of conical bearings 16, one bearing of each pair being preferably in the form of a screw to permit adjustment. The opposite end or arms of the link are recessed to receive conical bearing screws 17 carried by the arms 12, as shown more clearly in Fig. 4, and the arms of the link are preferably connected together by a cross bar 18 in order to prevent spreading.

The equalizing or guiding device is of such nature that the platform 10 will always remain approximately horizontal, and the downward stress of the suspension rod will be the same no matter where the weight or load is placed. If the load be placed on the platform at a point near the suspension rod, there will be a nearly direct vertical pull on the rod, and if placed near the outer edge of the platform, there will be some tendency to swing the platform rearward, or in the direction of the suspension rod, and to move the latter out of a vertical line. This, however, is prevented by the equalizing or guiding link, and the platform is allowed to move only in a vertical, or substantially vertical path.

In the construction illustrated in Figs. 5, 6 and 7 the link is reversed, one end being pivoted to the front of the base, and the opposite end or arms of the link being pivoted to the under side of the load receiver at a point adjacent to that edge of the receiver to which the suspension rod is attached.

Fig. 7 illustrates in detail the form of pivotal connection employed, the load receiver or platform being provided with an arm 20 from which extends a bearing cone 21 entering a small recess formed in one side of the arm of the link, and the platform has a threaded opening for the passage of a conical bearing screw 23 that enters a small recess formed in the opposite side of the arm.

It is found in practice that the correct weight will be indicated no matter what the position of the load on the platform may be, and the vertical plane of the center of gravity of the load receiver and suspension bar remains practically constant.

In Fig. 8 is shown a further modification of the link. In this case the link is triangular and at one corner carries a link 25 for connection with the load receiver. The remaining corners of the link carry bearing cones 26 which may be mounted in suitable bearings on the base or other support.

I claim:—

1. In a weighing scale, a weight indicating means, a load receiver, a suspension means forming a connection between the indicating means and the load receiver, and a guiding frame having at least three pivotal connections between the under-side of the load receiver and a fixed point, said frame being arranged to be subjected to endwise strain during the weighing operation, and serving to prevent swaying of the load receiver in any direction.

2. In a weighing scale, a weight indicating means, a load receiving platform, a suspension rod rigidly secured to the platform and extending from one edge thereof, said rod forming a connection between the platform and the indicating means, and a guiding means pivotally connecting the under side of the platform to a fixed point and arranged to be subjected to endwise strain during the weighing operation, said guiding means serving to prevent swaying movement of the platform in any direction.

In testimony that I claim the foregoing as my own, I have hereto affixed my signature in the presence of two witnesses.

WILLIAM G. TEMPLETON.

Witnesses:
 JNO. E. PARKER,
 E. HUME TALBERT.